(12) United States Patent
Abe

(10) Patent No.: US 10,100,917 B2
(45) Date of Patent: Oct. 16, 2018

(54) CASING

(71) Applicant: SUMITOMO HEAVY INDUSTRIES, LTD., Tokyo (JP)

(72) Inventor: Kazuhisa Abe, Okayama (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/409,153

(22) Filed: Jan. 18, 2017

(65) Prior Publication Data

US 2017/0219081 A1    Aug. 3, 2017

(30) Foreign Application Priority Data

Jan. 29, 2016 (JP) ................. 2016-016553

(51) Int. Cl.
*F16H 57/025* (2012.01)
*F16H 57/033* (2012.01)
*F16H 57/02* (2012.01)

(52) U.S. Cl.
CPC ......... *F16H 57/025* (2013.01); *F16H 57/033* (2013.01); *F16H 2057/02034* (2013.01); *F16H 2057/02069* (2013.01); *F16H 2057/02073* (2013.01); *F16H 2057/02091* (2013.01)

(58) Field of Classification Search
CPC ...... F16H 57/02; F16H 57/025; F16H 57/031; F16H 57/033; F16H 2057/02052; F16H 2057/02073; F16H 2057/02034; F16H 2057/02069

See application file for complete search history.

(56) References Cited

U.S. PATENT DOCUMENTS

2010/0095804 A1 *  4/2010  Gilbert ................ F16H 57/02
                                               74/606 A

FOREIGN PATENT DOCUMENTS

| DE | 102008004337 A1 * | 10/2008 | ........... F16H 57/033 |
| DE | 10-2013-002051 A1 | 8/2014 | |
| JP | H08-114256 A | 5/1996 | |
| JP | 2002-021986 A | 1/2002 | |

(Continued)

OTHER PUBLICATIONS

Search report issued in European Application No. 17151364, dated Jun. 2, 2017.

*Primary Examiner* — Thomas C Diaz
(74) *Attorney, Agent, or Firm* — Michael Best & Friedrich LLP

(57) ABSTRACT

A casing includes an input-side casing part housing an input shaft and an output-side casing part housing an output shaft. In regard to a dimension in an axial direction of the output shaft, the dimension of the input-side casing part is smaller than the dimension of the output-side casing part. The output-side casing part includes an output-side bottom surface that serves as an installation surface when the casing is vertically installed; the output-side bottom surface includes mounting portions for vertical installation near four corners thereof; the input-side casing part includes an input-side back surface that serves as an installation surface when the casing is horizontally installed; the output-side casing part includes an output-side back surface that serves as an installation surface when the casing is horizontally installed; and mounting portions for horizontal installation are provided near four corners of the output-side back surface and on the input-side back surface.

10 Claims, 10 Drawing Sheets

(56) References Cited

FOREIGN PATENT DOCUMENTS

WO     WO-2009/121474 A1    10/2009
WO     WO-2009121474 A1 * 10/2009  ........... F16H 57/025

* cited by examiner

CASING

RELATED APPLICATIONS

Priority is claimed to Japanese Patent Application No. 2016-016553, filed Jan. 29, 2016, the entire content of which is incorporated herein by reference.

BACKGROUND

Technical Field

A certain embodiment of the present invention relates to a casing.

Description of Related Art

A casing of a speed reducer, which includes an input-side casing part housing an input shaft and an output-side casing part housing an output shaft, is disclosed in the related art.

The casing is formed substantially in the shape of a rectangular parallelepiped as a whole, and can use a plurality of surfaces as an installation surface.

SUMMARY

The invention provides a casing that includes an input-side casing part housing at least an input shaft and an output-side casing part housing at least an output shaft. In regard to a dimension in an axial direction of the output shaft, a dimension of the input-side casing part is smaller than a dimension of the output-side casing part. The output-side casing part includes an output-side vertical installation surface that serves as an installation surface when the casing is installed so that the output shaft is parallel to a vertical direction, the output-side vertical installation surface includes mounting portions for vertical installation near four corners thereof, the input-side casing part includes an input-side horizontal installation surface that serves as an installation surface when the casing is installed so that the output shaft is parallel to a horizontal direction, the output-side casing part includes an output-side horizontal installation surface that serves as an installation surface when the casing is installed so that the output shaft is parallel to the horizontal direction, and mounting portions for horizontal installation are provided near four corners of the output-side horizontal installation surface of the output-side casing part and on the input-side horizontal installation surface of the input-side casing part.

DETAILED DESCRIPTION

There is a problem that the total weight of the casing is large.

According to an embodiment of the present invention, it is desirable to further reduce the weight of a casing while maintaining characteristics in which a plurality of surfaces can be used as an installation surface.

In the casing, the dimension of the input-side casing part in the axial direction of the output shaft is smaller than the dimension of the output-side casing part in the axial direction of the output shaft.

Further, in the casing, the output-side vertical installation surface of the output-side casing part, which serves as an installation surface when the casing is installed so that the output shaft is parallel to the vertical direction, includes the mounting portions for vertical installation near the four corners thereof. Furthermore, the mounting portions for horizontal installation are provided on the input-side horizontal installation surface of the input-side casing part that serves as an installation surface when the casing is installed so that the output shaft is parallel to the horizontal direction and near the four corners of the output-side horizontal installation surface of the output-side casing part that serves as an installation surface when the casing is installed so that the output shaft is parallel to the horizontal direction.

Accordingly, it is possible to further reduce the weight of the casing while ensuring the installation surfaces for both the vertical (perpendicular) installation where the casing is installed so that the output shaft is parallel to the vertical direction and the horizontal (transverse) installation where the casing is installed so that the output shaft is parallel to the horizontal direction.

According to the invention, it is possible to further reduce the weight of a casing while maintaining characteristics in which a plurality of surfaces can be used as an installation surface.

An example of an embodiment of the invention will be described in detail below with reference to the drawings.

Figure 5:
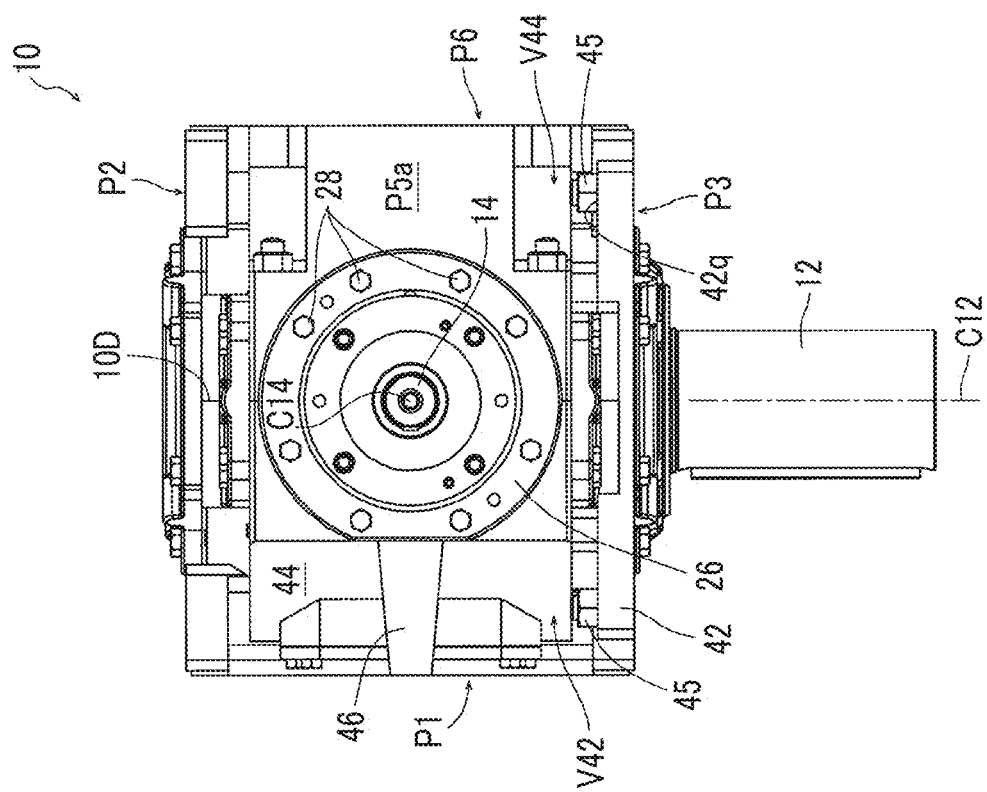
FIG. 5 is a right side view of the speed reducer.
Figure 6:
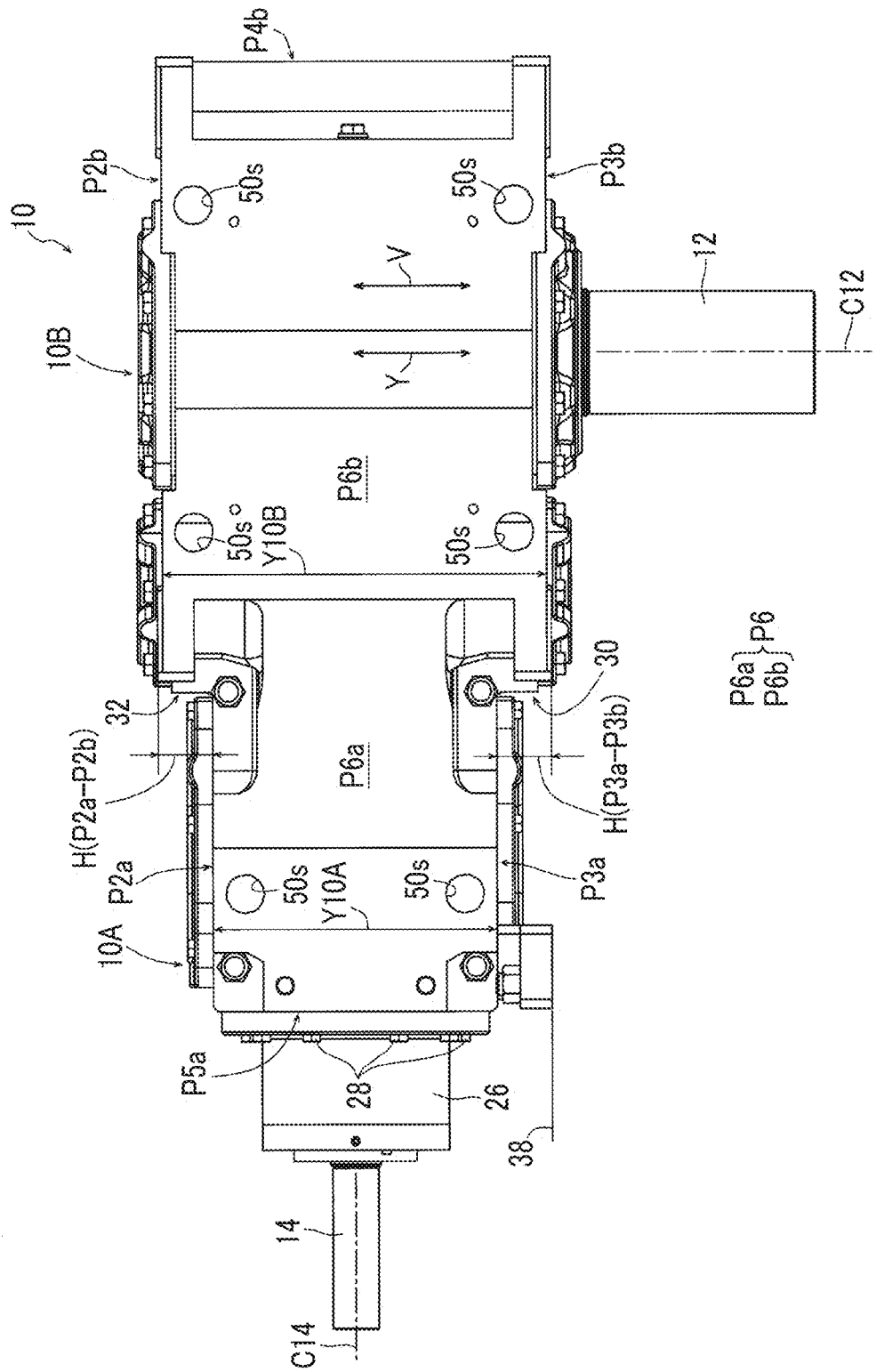
FIG. 6 is a back view of the speed reducer.
Figure 7:
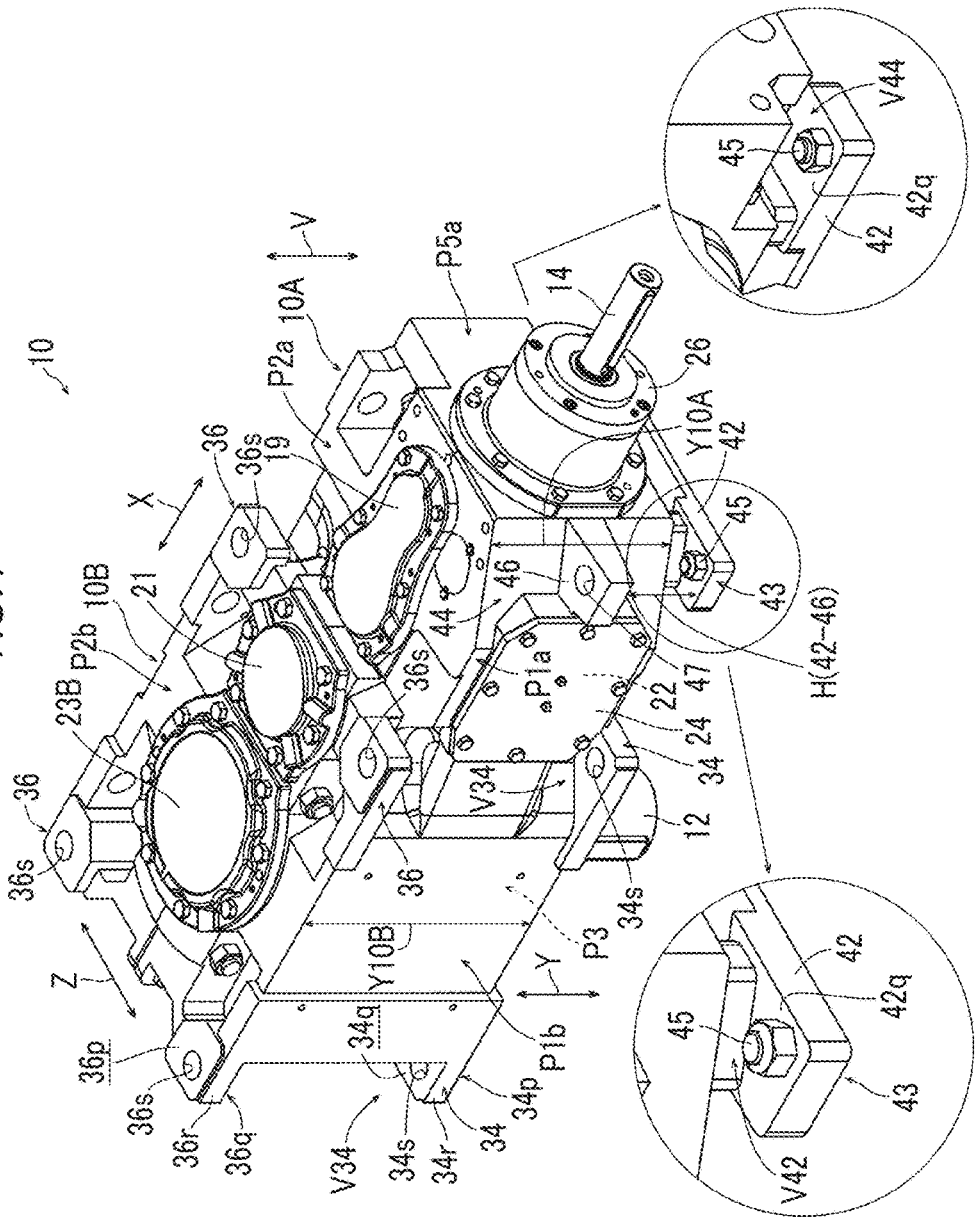
FIG. 7 is a perspective view of the speed reducer that is seen obliquely from above and includes partial enlarged views.
Figure 8:
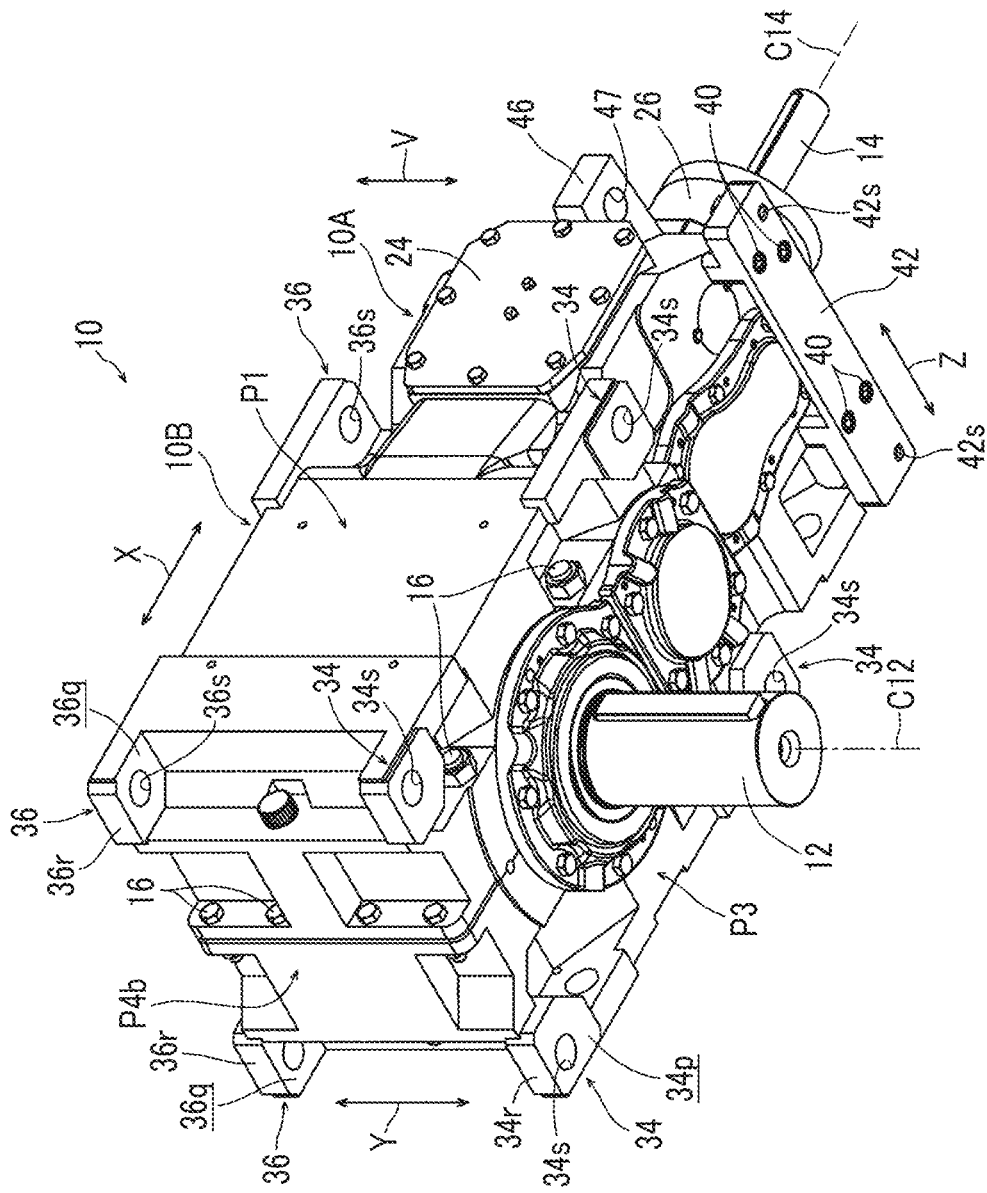
FIG. 8 is a perspective view of the speed reducer that is seen obliquely from below.

FIGS. 1 to 6 are six views (a front view, a plan view, a bottom view, a left side view, a right side view, and a back view) of a speed reducer including a casing according to an example of an embodiment of the invention when the speed reducer is installed so that an output shaft is parallel to a vertical direction. Further, FIG. 7 is a perspective view of the speed reducer that is seen obliquely from above and includes partial enlarged views, and FIG. 8 is a perspective view of the speed reducer that is seen obliquely from below.

The speed reducer of this embodiment includes a casing 10, an input shaft 14, and an output shaft 12.

The structure of the casing will be described in detail below appropriately with reference to the perspective views of FIGS. 7 and 8 in addition to the six views of FIGS. 1 to 6.

Not only the casing 10 can be vertically (perpendicularly) installed so that an output shaft 12 is parallel to a vertical direction but also the casing 10 can be horizontally (transversely) installed so that the output shaft 12 is parallel to a horizontal direction.

"Vertically (perpendicularly)" means that the output shaft does not need to exactly correspond to the vertical direction and may be inclined from the vertical direction. In short, a vertical installation surface to be described below has only to be installed on a counterpart-side installation surface.

Likewise, "horizontally (transversely)" means that the output shaft does not need to exactly correspond to the horizontal direction and may be inclined from the horizontal direction. In short, a horizontal installation surface to be described below has only to be installed on a counterpart-side installation surface. Likewise, the term of "vertical" or "horizontal" also does not necessarily means "exactly vertical" or "exactly horizontal".

The casing 10 is adapted to be capable of being separated into a first casing body 10F and a second casing body 10G on a bisecting plane 10D (a vertical plane in the case of vertical installation and a horizontal plane in the case of horizontal installation) passing through an axis C12 of the output shaft 12 and an axis C14 of the input shaft 14. The first casing body 10F and the second casing body 10G are connected to each other by casing body-connecting bolts 16.

The structure of the casing 10 in a state in which the first casing body 10F and the second casing body 10G are connected to each other will be described in the following description.

The casing 10 includes an input-side casing part 10A that houses at least the input shaft 14 and an output-side casing part 10B that houses at least the output shaft 12. The input shaft 14 is orthogonal to the output shaft 12.

Specifically, the input-side casing part 10A can house the input shaft 14, a rectangular speed reducing mechanism (not shown), and a first intermediate-stage speed reducing mechanism (not shown). The output-side casing part 10B can house the output shaft 12 and a second intermediate-stage speed reducing mechanism (not shown) and an output-stage speed reducing mechanism (not shown) that are connected to the subsequent stage of the first intermediate-stage speed reducing mechanism.

The input-side casing part 10A is formed substantially in the shape of a rectangular parallelepiped. The output-side casing part 10B is also formed substantially in the shape of a rectangular parallelepiped. The input-side casing part 10A and the output-side casing part 10B are continuously and integrally formed (not only on the first casing body 10F but also the second casing body 10G). A space formed in the input-side casing part 10A and a shape formed in the output-side casing part 10B communicate with each other as a series of space.

Figure 1:
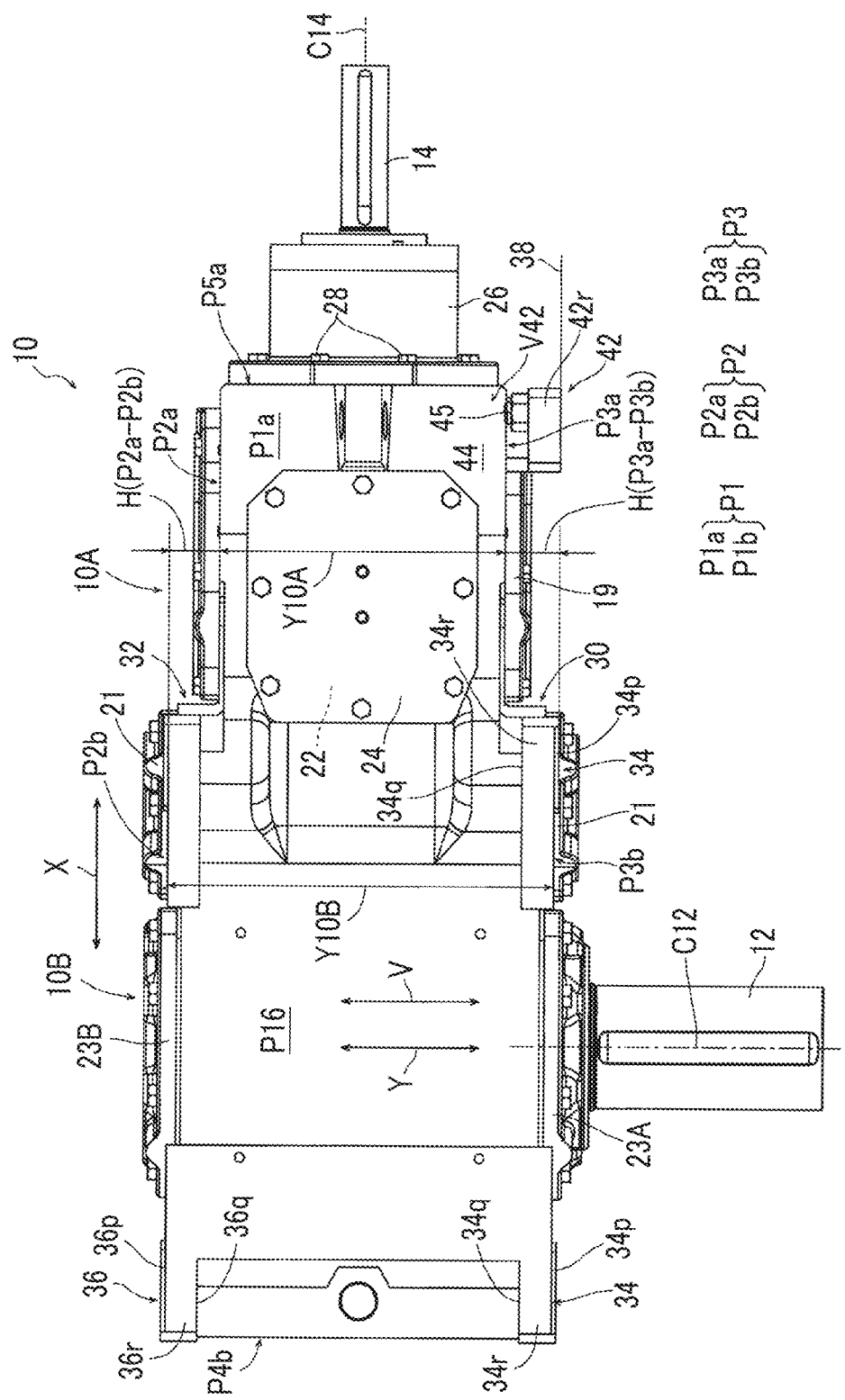
FIG. 1 is a front view of a speed reducer including a casing according to an example of an embodiment of the invention when the speed reducer is installed so that an output shaft is parallel to a vertical direction.

For the sake of convenience, a surface (which includes an inspection hole 22 and a cover 24 to be described below) shown in FIG. 1 is referred to as a front surface P1, a surface of the front surface P1 corresponding to the input-side casing part 10A is referred to as an input-side front surface P1$a$, and a surface of the front surface P1 corresponding to the output-side casing part 10B is referred to as an output-side front surface P1$b$.

Figure 2:
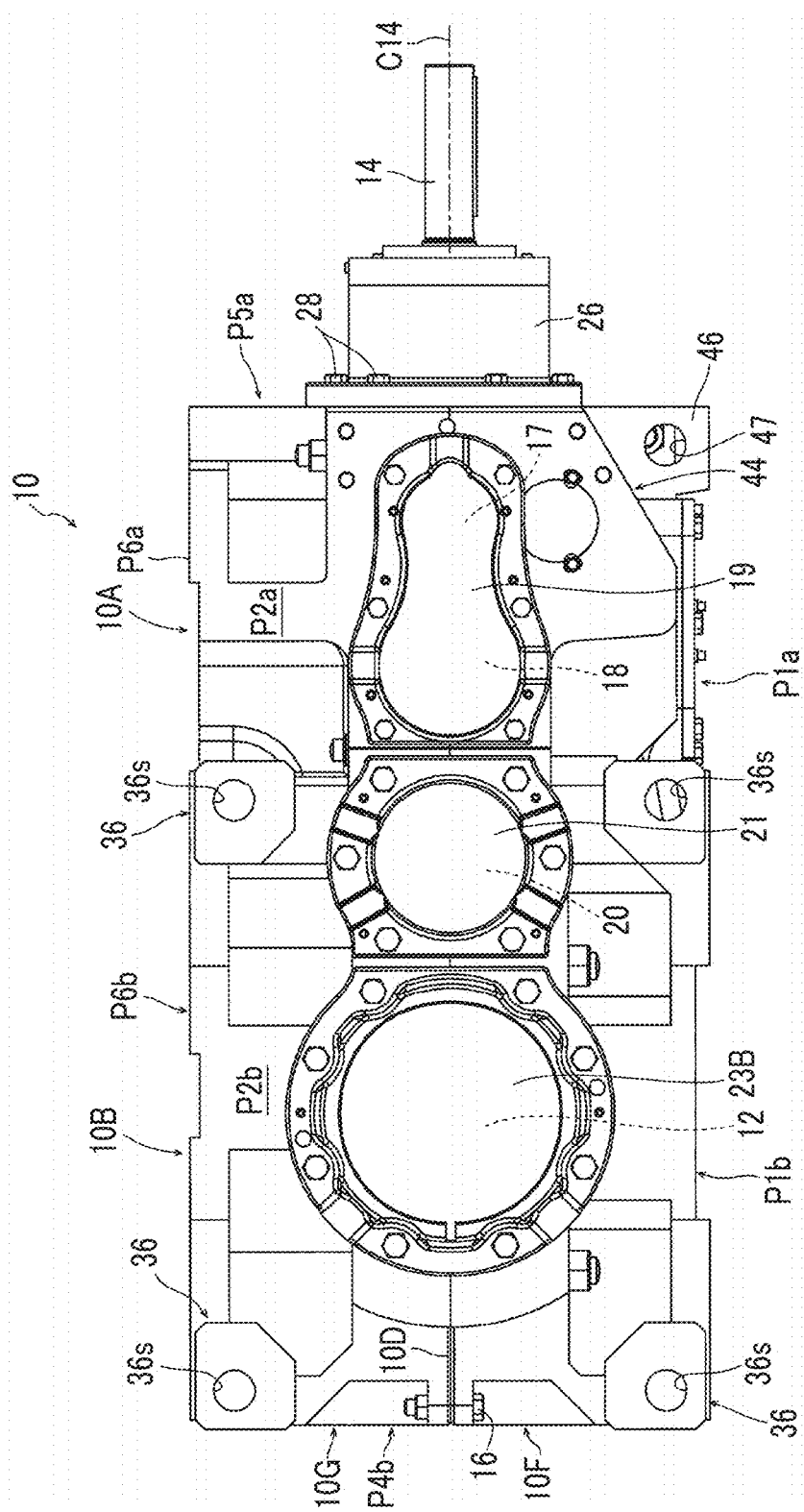
FIG. 2 is a plan view of the speed reducer.
Figure 3:
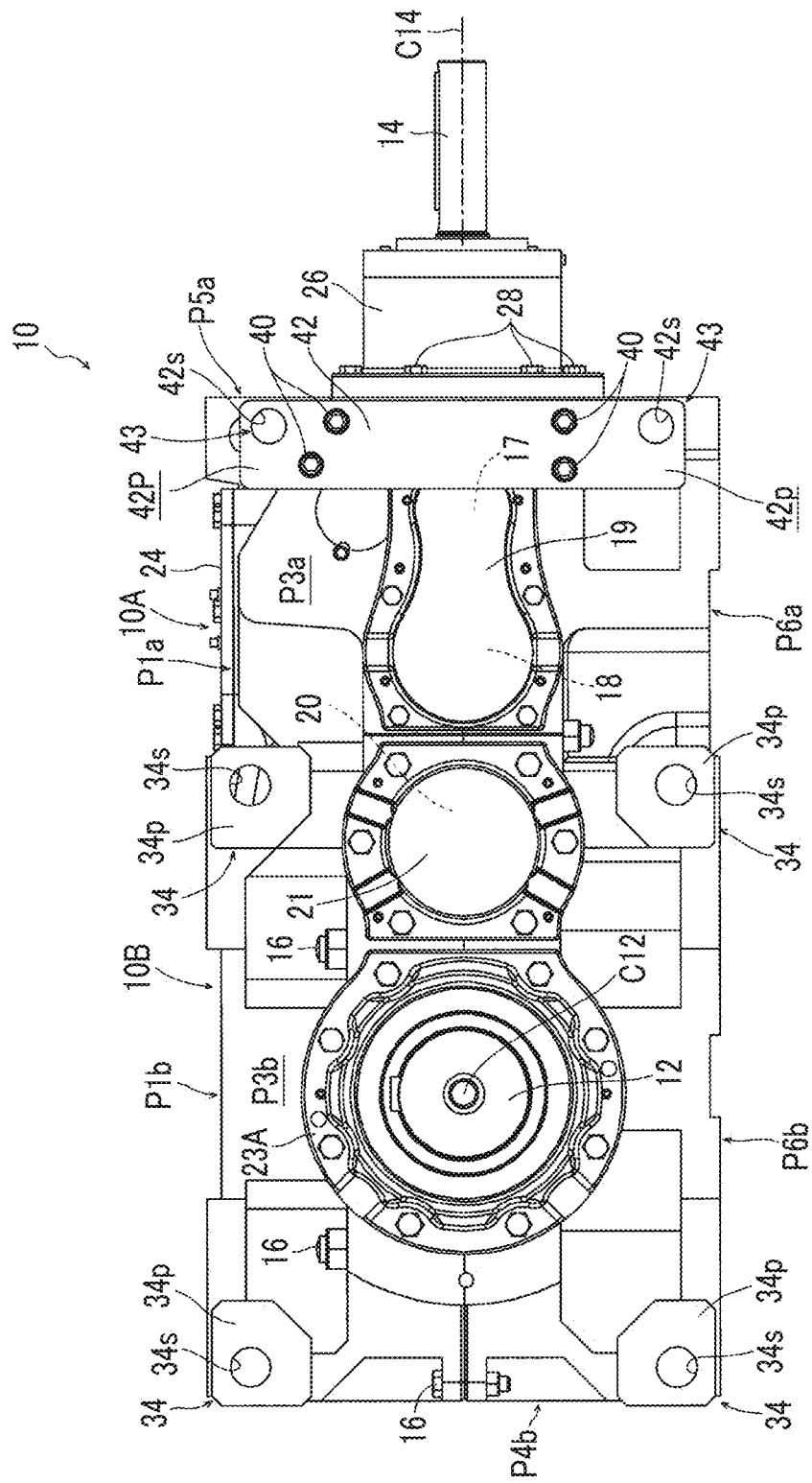
FIG. 3 is a bottom view of the speed reducer.

Likewise, a surface shown in FIG. 2 is referred to as a top surface P2, a surface of the top surface P2 corresponding to the input-side casing part 10A is referred to as an input-side top surface P2$a$, and a surface of the top surface P2 corresponding to the output-side casing part 10B is referred to as an output-side top surface P2$b$. Further, a surface (from which the output shaft 12 protrudes) shown in FIG. 3 is referred to as a bottom surface P3, a surface of the bottom surface P3 corresponding to the input-side casing part 10A is referred to as an input-side bottom surface P3$a$, and a surface of the bottom surface P3 corresponding to the output-side casing part 10B is referred to as an output-side bottom surface P3$b$. Since the bottom surface P3 and the top surface P2 can serve as an installation surface when the casing 10 is installed so that the output shaft 12 is parallel to the vertical direction, the bottom surface P3 and the top surface P2 correspond to a "vertical installation surface".

Figure 4:
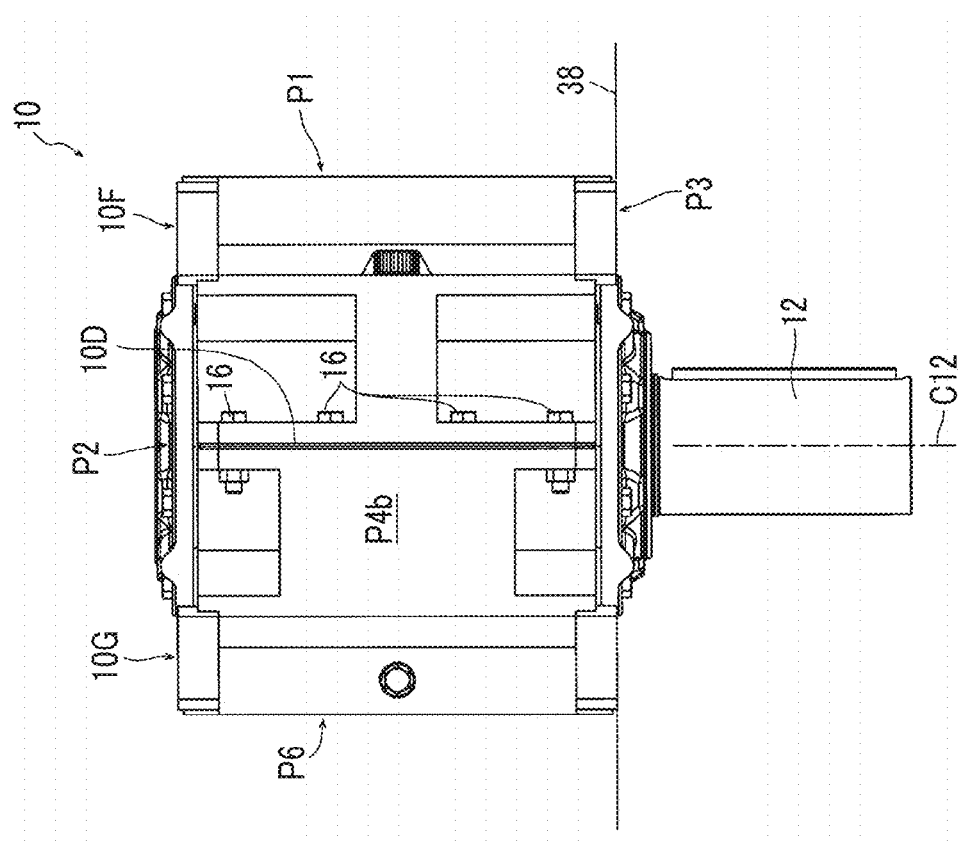
FIG. 4 is a left side view of the speed reducer.

Further, a left side surface shown in FIG. 4 is referred to as an output-side surface P4$b$, and a right side surface (from which the input shaft 14 protrudes) shown in FIG. 5 is referred to as an input-side surface P5$a$. Furthermore, a surface shown in FIG. 6 is referred to as a back surface P6, a surface of the back surface P6 corresponding to the input-side casing part 10A is referred to as an input-side back surface P6$a$, and a surface of the back surface P6 corresponding to the output-side casing part 10B is referred to as an output-side back surface P6$b$. Since the back surface P6 can serve as an installation surface when the casing 10 is installed so that the output shaft 12 is parallel to the horizontal direction, the back surface P6 corresponds to a "horizontal installation surface".

A numeral attached behind reference character "P", which denotes each surface, represents the number of the drawing accompanied with this specification, "a" attached to the end represents the input side, and "b" attached to the end represents the output side. For example, "input-side bottom surface" is denoted by reference numeral "P3$a$". "3" of "P3$a$" means that the "bottom surface" is shown in FIG. 3 of the six views of FIGS. 1 to 6.

In the casing 10, a bearing housing part 26 is mounted on the input-side surface P5$a$ of the input-side casing part 10A by housing bolts 28. The bearing housing part 26 houses a bearing (not shown) of the input shaft 14.

Further, in each drawing, the end face of an orthogonal shaft 17 of the rectangular speed reducing mechanism and the end face of a first intermediate shaft 18 of the first intermediate-stage speed reducing mechanism are covered with an input-side shaft cover 19. The end face of a second intermediate shaft 20 of the second intermediate-stage speed reducing mechanism is covered with an intermediate shaft cover 21. Furthermore, reference numeral 23A denotes a frame body that is provided on a side where the output shaft 12 protrudes, reference numeral 23B denotes a cover that is provided on a side where the output shaft 12 does not protrude, reference numeral 22 denotes an inspection hole, and reference numeral 24 denotes a cover for the inspection hole 22.

In this specification, the casing means a casing main body. That is, for example, members that is mounted on the casing main body, such as the bearing housing part and the covers covering the respective bearing holes or the inspection hole, are not included in the category of the casing (or the input-side casing part and the output-side casing part). Likewise, for example, a portion that protrudes only at a part, such as a protrusion, is not included in the category of the dimension of the casing (or the input-side casing part, the output-side casing part).

The structure of the input-side casing part 10A and the structure of the output-side casing part 10B will be described in more detail below.

For the sake of convenience, the axial direction of the output shaft 12 is referred to as a Y direction. Further, the axial direction of the input shaft 14 is referred to as an X direction, and a direction, which is perpendicular to the output shaft 12 and is perpendicular to a plane including the output shaft 12 and the input shaft 14, is referred to as a Z direction.

In regard to a dimension in the Y direction (the axial direction of the output shaft 12), a dimension Y10A of the input-side casing part 10A in the Y direction is smaller than a dimension Y10B of the output-side casing part 10B in the Y direction by (Y10B-Y10A).

Specifically, as clearly shown in FIGS. 1 and 6, a flat stepped portion 32 having a height H (P2a-P2b) is formed on the top surface P2 of the casing 10 between the input-side top surface P2a of the input-side casing part 10A and the output-side top surface P2b of the output-side casing part 10B. Further, a bottom-surface stepped portion 30 having a height H (P3a-P3b) is formed on the bottom surface P3 of the casing 10 between the input-side bottom surface P3a of the input-side casing part 10A and the output-side bottom surface P3b of the output-side casing part 10B.

That is, the dimension Y10A of the input-side casing part 10A in the Y direction is smaller than the dimension Y10B of the output-side casing part 10B in the Y direction by (Y10B-Y10A) [H (P2a-P2b)+H (P3a-P3b)]. "H (P2a-P2b)=H (P3a-P3b)" is satisfied in this example.

The output-side casing part 10B includes two surfaces, that is, the output-side bottom surface P3b and the output-side top surface P2b, which can serve as the installation surface when the casing 10 is installed so that the output shaft 12 is parallel to the vertical direction, as the "vertical installation surface". That is, not only the casing 10 can be vertically installed so that the output shaft 12 protrudes downward in the vertical direction and the output-side bottom surface P3b shown in FIG. 3 faces the lower side and is installed on a counterpart-side installation surface 38, but also the casing 10 can be vertically installed so that the output shaft 12 protrudes upward in the vertical direction and the output-side top surface P2b shown in FIG. 2 faces the lower side and is installed on the counterpart-side installation surface 38.

Mounting portions 34 for vertical installation are provided (at a total of four positions) near four corners of the output-side bottom surface P3b that functions as the vertical installation surface.

Each of the mounting portions 34 for vertical installation includes a plate portion 34r that includes a counterpart member-contact surface 34p and a bolt pressing surface 34q on the surface and back thereof, and an installation bolt hole 34s that passes through the plate portion 34r in the Y direction (the axial direction of the output shaft 12).

As particularly clearly shown in FIG. 7 or 8, the counterpart member-contact surface 34p is parallel to the output-side bottom surface P3b (or the output-side top surface P2b) that is the vertical installation surface. The counterpart member-contact surface 34p forms a surface that comes into contact with a counterpart member when the casing 10 is perpendicularly installed, that is, when the casing 10 is installed so that the output shaft 12 faces the lower side in the vertical direction. The bolt pressing surface 34q is disposed parallel to the counterpart member-contact surface 34p with a distance, which corresponds to the thickness of the plate portion 34r, interposed therebetween. The installation bolt hole 34s passes through the counterpart member-contact surface 34p and the bolt pressing surface 34q of the plate portion 34r in the Y direction.

In the casing 10, a mounting portion-upper space V34, in which a tool for tightening an installation bolt (not shown) is put, is ensured above the plate portion 34r of each mounting portion for vertical installation. Here, "above" means the upper side in the vertical direction when the casing 10 is vertically installed.

Likewise, mounting portions 36 for vertical installation, each of which includes a plate portion 36r having the same structure as the structure of the plate portion 34r, that is, a structure in which a counterpart member-contact surface 36p and a bolt pressing surface 36q are provided on the surface and back of the plate portion 36r, are also provided (at a total of four positions) near four corners of the output-side top surface P2b, which can function as the "vertical installation surface", so as to be symmetrical to the mounting portions 34 for vertical installation.

When the casing 10 is to be installed so that the output shaft 12 is parallel to the vertical direction, basically, any one surface of the output-side bottom surface P3b and the output-side top surface P2b is used as the vertical installation surface and bolts (not shown) are screwed into the installation bolt holes 34s or 36s of the four mounting portions 34 or 36 for vertical installation provided on the output-side bottom surface P3b or the output-side top surface P2b. In this way, the casing 10 is installed.

Since the bottom-surface stepped portion 30 is formed between the output-side bottom surface P3b of the output-side casing part 10B and the input-side bottom surface P3a of the input-side casing part 10A in the casing 10 as described above, the input-side bottom surface P3a is higher from the counterpart-side installation surface 38 than the output-side bottom surface P3b by a height H (P3a-P3b). For this reason, when the casing 10 is installed so that the output shaft 12 is parallel to the vertical direction, a gap (=H (P3a-P3b)) is formed between the input-side bottom surface P3a of the casing 10 and the counterpart-side installation surface 38 (the same applies when the casing 10 is installed so that the top surface P2 faces the lower side).

In general, there is no particular problem even though the input-side bottom surface P3a (or the input-side top surface P2a) is spaced apart from the counterpart-side installation surface 38 in a state in which the casing 10 is installed. However, stronger installation may be required in some uses.

In this case, the casing 10 is provided with an installation attachment 42 that is mounted on the input-side casing part 10A and comes into contact with the counterpart-side installation surface 38 when the casing 10 is installed so that the output shaft 12 is parallel to the vertical direction.

The installation attachment 42 is formed of a member having the shape of an elongated plate, and is mounted on the input-side bottom surface P3a by four mounting bolts 40 (see FIGS. 3 and 8) that are screwed from the counterpart-side installation surface 38.

The installation attachment 42 is provided with an attachment mounting portion 43 that is used to install the installation attachment 42 (mounted on the input-side bottom surface P3a) on the counterpart-side installation surface 38.

Specifically, the attachment mounting portion 43 includes attachment bolt holes 42s (see FIGS. 3 and 8) that are formed at both end portions of the installation attachment 42 (two positions) and pass through a bolt pressing surface 42q and a counterpart member-contact surface 42p of the installation attachment 42 (an example in which installation bolts 45 are tightened is shown in FIG. 7).

For example, as particularly clearly shown in FIG. 7, the input-side casing part 10A includes an attachment-upper space V42 above (the installation bolts 45 of) the attachment mounting portion 43 (above the attachment mounting portion 43 in the vertical direction in a state in which the casing 10 is vertically installed) (see FIGS. 5 and 7).

Specifically, the input-side casing part 10A includes an input-side chamfer 44 that is formed at a corner where the input-side front surface P1a and the input-side surface P5a cross each other and is largely chamfered. Further, the input-side casing part 10A includes a lift fitting-fixing portion 46 that is used to fix a lift fitting (not shown) when the casing 10 is lifted.

The lift fitting-fixing portion 46 is formed of one plate body that protrudes in the X direction and the Z direction from the middle of the input-side chamfer 44 in the Y direction so as to be substantially flush with the input-side surface P5a and the input-side front surface P1a. A through hole 47 to which the lift fitting is to be locked is formed in the lift fitting-fixing portion 46 in the Y direction (in parallel to the output shaft 12).

The lift fitting-fixing portion 46 and (the installation bolt 45 of) the attachment mounting portion 43 overlap each other when seen in the Y direction (the axial direction of the output shaft 12) (see FIG. 1). However, only one lift fitting-fixing portion 46 is provided on the input-side chamfer 44 in the Y direction, and is provided at a position that is spaced apart from the attachment mounting portion 43 in the Y direction by H (42-46).

Due to this structure, the input-side casing part 10A ensures the attachment-upper space V42 above the attachment bolt hole 42s (and below the lift fitting-fixing portion 46) (when the casing 10 is vertically installed).

A chamfer is not provided at a corner where the input-side back surface P6a and the input-side surface P5a of the input-side casing part 10A cross each other. However, since an attachment-upper space V44, which is formed by notching the input-side casing part 10A in a rectangular shape, is formed above the attachment mounting portion 43 at the corner where the input-side back surface P6a and the input-side surface P5a cross each other (see FIGS. 5 and 7), the installation bolt 45 can be tightened to the attachment bolt hole 43s.

The input-side casing part 10A includes the inspection hole 22 on the input-side front surface P1a (the inspection hole 22 is covered with the cover 24). The inspection hole 22 does not reach the output-side casing part 10B. The inspection hole 22 is formed only at the input-side casing part 10A together with the cover 24.

That is, since the casing 10 has a bisecting structure including the first casing body 10F and the second casing body 10G, the inspection hole does not need to be made large for the assembly of a gear and the like. Since the inspection hole 22 is made small due to this structure, the inspection hole 22 is formed not to reach the output-side casing part 10B. Accordingly, the mounting portion-upper spaces V34 can be ensured above the mounting portions 34 for vertical installation provided at the four corners of the output-side casing part 10B. Specifically, in the casing 10, the mounting portion-upper space V34 is formed above the installation bolt hole 34s, which is formed so as to pass through each of the mounting portions 34 for vertical installation in the Y direction (the axial direction of the output shaft 12), so as to be opened in two directions (the X direction and the Z direction) that are orthogonal to each other.

As described at the beginning, the casing 10, not only the casing 10 can be vertically (perpendicularly) installed so that the output shaft 12 is parallel to the vertical direction but also the casing 10 can be horizontally (transversely) installed so that the output shaft 12 is parallel to the horizontal direction.

Figure 9:
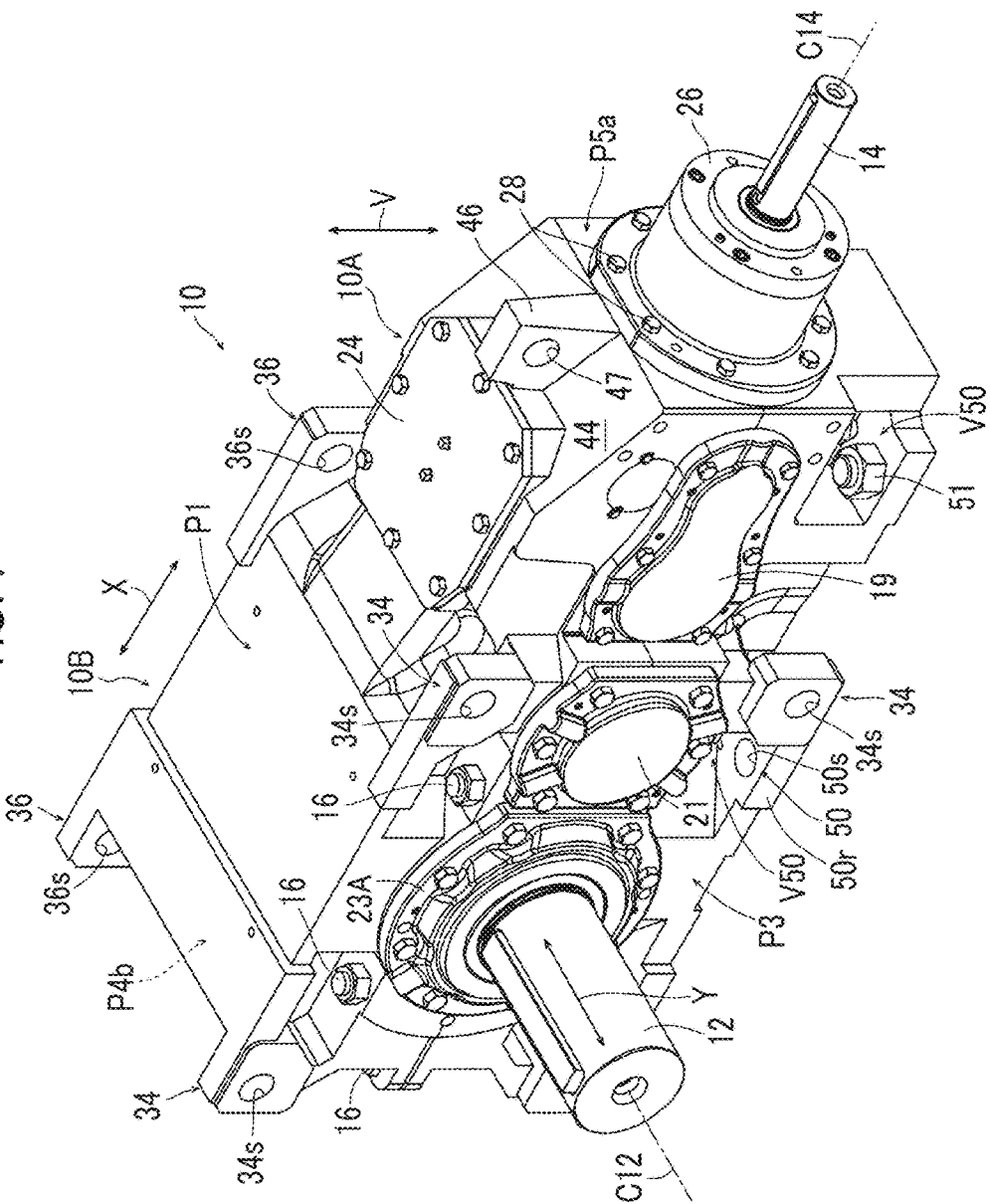
FIG. 9 is a perspective view of the speed reducer that is seen obliquely from above when the speed reducer is installed so that the output shaft is parallel to a horizontal direction.
Figure 10:
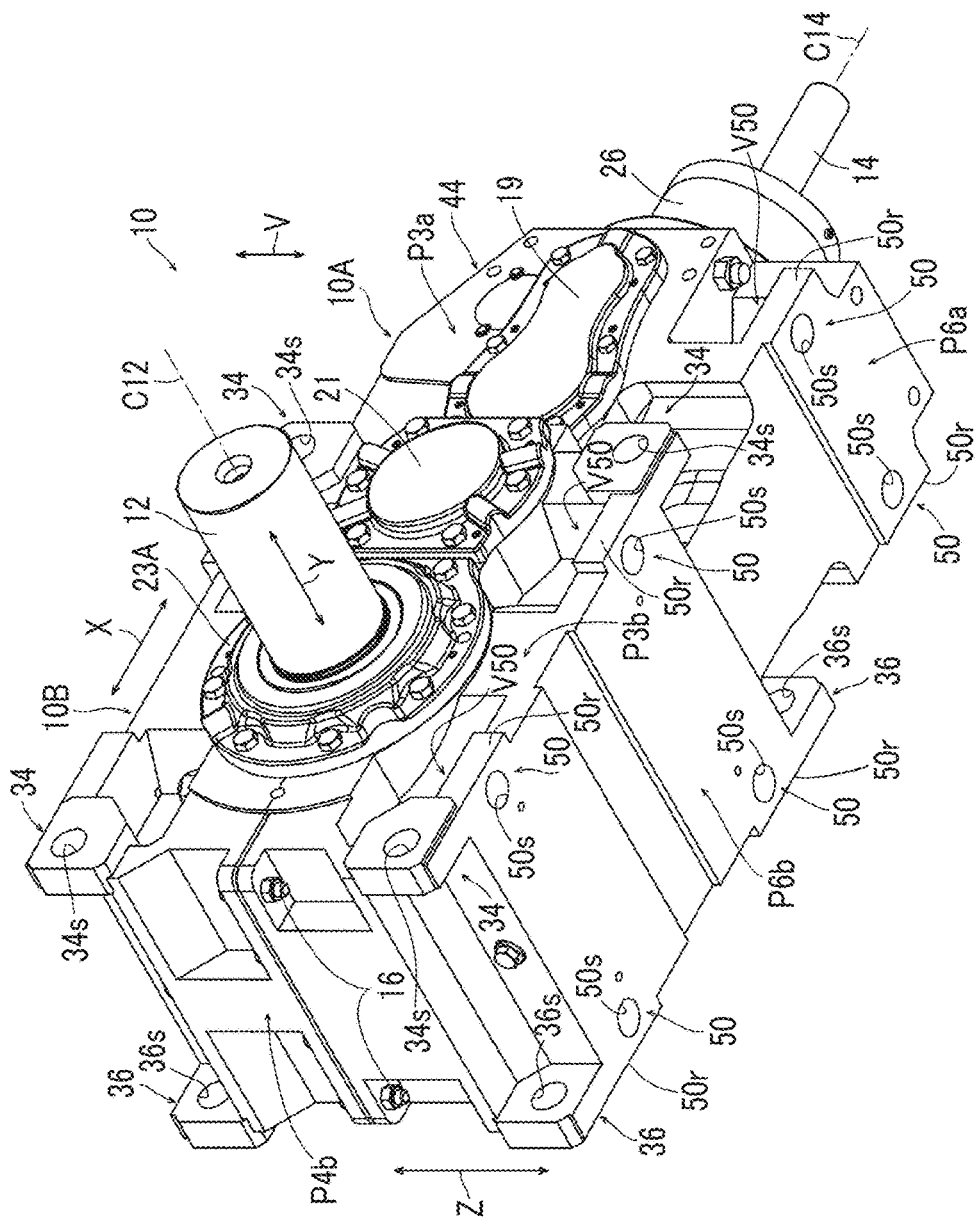
FIG. 10 is a perspective view of the speed reducer of FIG. 9 that is seen obliquely from below.

FIG. 9 is a perspective view of the speed reducer that is seen obliquely from above when the speed reducer is installed so that the output shaft 12 is parallel to the horizontal direction, and FIG. 10 is a perspective view of the speed reducer of FIG. 9 that is seen obliquely from below.

Horizontal installation will be described in detail with reference to both FIG. 9 and FIG. 10.

When the casing 10 is installed so that the output shaft 12 is parallel to the horizontal direction, the casing 10 is installed so that the front surface P1 (including the inspection hole 22) shown in FIG. 1 faces the upper side in the vertical direction and the back surface P6 shown in FIG. 6 faces the lower side in the vertical direction (the back surface P6 comes into contact with the counterpart-side installation surface 38). As a result, the casing 10 is installed in a state in which the bottom surface P3 (from which the output shaft 12 protrudes) shown in FIG. 3 stands vertically in this case and the output shaft 12 is parallel to the horizontal direction.

That is, the input-side casing part 10A of the casing 10 includes the surface (the input-side back surface P6a of FIG. 6), which serves as an installation surface when the casing 10 is installed so that the output shaft 12 is parallel to the horizontal direction, as an "input-side horizontal installation surface". Likewise, the output-side casing part 10B includes the surface (the output-side back surface P6b of FIG. 6), which serves as an installation surface when the casing 10 is installed so that the output shaft 12 is parallel to the horizontal direction, as an "output-side horizontal installation surface".

In other words, the input-side back surface P6a (the surface shown in FIG. 6: the surface opposite to the surface including the inspection hole 22) of the input-side casing part 10A corresponds to the input-side horizontal installation surface, and the output-side back surface P6b of the output-side casing part 10B corresponds to the output-side horizontal installation surface.

The input-side back surface P6a (the input-side horizontal installation surface) and the output-side back surface P6b (the output-side horizontal installation surface) are flush with each other, and can come into direct contact with the counterpart-side installation surface 38. Accordingly, the casing 10 does not particularly require an accessory, such as the installation attachment 42, when being transversely installed.

Further, mounting portions 50 for horizontal installation are provided at four positions near four corners of the output-side back surface P6b (the output-side horizontal installation surface) of the output-side casing part 10B, and mounting portions 50 for horizontal installation are also provided at two positions near end portions, which are opposite to the output-side casing part, of the input-side back surface P6a (the input-side horizontal installation surface) of the input-side casing part 10A.

The mounting portion 50 for horizontal installation also has a structure similar to the structures of the mounting portions 34 and 36 for vertical installation. That is, each of the mounting portions 50 for horizontal installation includes a plate portion 50r that is provided with an installation bolt hole 50s (an installation bolt 51 is shown in a part of FIG. 9) that passes through the plate portion in the Z direction (a direction orthogonal to the output shaft 12), and an upper space V50 is provided above each installation bolt hole 50s (above each installation bolt hole 50s in the vertical direction when the casing 10 is horizontally installed). Each upper space V50 is opened in two directions (the X direction and the Y direction) that are orthogonal to each other.

Next, an action will be described.

The casing 10 includes the input-side casing part 10A that houses the rectangular speed reducing mechanism and the first intermediate-stage speed reducing mechanism in addition to the input shaft 14, and the output-side casing part 10B that houses the second intermediate-stage speed reducing mechanism and the output-stage speed reducing mechanism connected to the subsequent stage of the first intermediate-stage speed reducing mechanism in addition to the output shaft 12.

In regard to the dimension of the casing 10 in the Y direction (the axial direction of the output shaft 12), the dimension Y10A of the input-side casing part 10A is smaller than the dimension Y10B of the output-side casing part 10B. Since the speed reducing mechanism corresponding to a preceding stage is housed in the input-side casing part 10A in addition to the input shaft 14, the size of a gear is relatively small. Since the diameter and length of the shaft are small, the input-side casing part 10A can be designed so as to house the speed reducing mechanism provided on the preceding stage even though the dimension Y10A of the input-side casing part 10A in the Y direction is small. Further, since the total weight of the casing 10 is reduced as much as the dimension Y10A of the input-side casing part 10A in the Y direction is reduced, the casing 10 of which the weight is further reduced can be obtained.

Further, the output-side casing part 10B of the casing 10 includes the output-side bottom surface P3b (an output-side vertical installation surface) that serves as an installation surface when the casing 10 is installed so that the output shaft 12 is parallel to the vertical direction, and includes four mounting portions 34 for vertical installation that are provided near four corners of the output-side bottom surface P3b. Bolts (not shown) are inserted and tightened into the installation bolt holes 34s of the mounting portions 34 for vertical installation provided at four positions, so that the casing 10 is fixed to the counterpart-side installation surface 38.

On the other hand, the input-side casing part 10A of the casing 10 includes the input-side back surface P6a (the input-side horizontal installation surface) that serves as an installation surface when the casing 10 is installed so that the output shaft 12 is parallel to the horizontal direction, and the output-side casing part 10B includes the output-side back surface P6b (the output-side horizontal installation surface) that serves as an installation surface when the casing 10 is installed so that the output shaft 12 is parallel to the horizontal direction. In addition, the mounting portions 50 for horizontal installation are provided at four positions near four corners of the output-side back surface P6b (the output-side horizontal installation surface) of the output-side casing part 10B and two positions near end portions, which are opposite to the output-side casing part, of the input-side horizontal installation surface of the input-side casing part 10A.

For this reason, the casing 10 can be installed not only vertically but also horizontally. Further, when the casing 10 is to be horizontally installed, the casing 10 can be strongly installed at a total of six positions, that is, at four positions near four corners of the output-side back surface P6b of the output-side casing part 10B and two positions on the input-side back surface P6a (the input-side horizontal installation surface) of the input-side casing part 10A (without requiring any installation attachment).

Furthermore, the casing 10 includes the installation attachment 42 that is mounted on the input-side casing part 10A and comes into contact with the counterpart-side installation surface 38 when the casing 10 is installed so that the output shaft 12 is parallel to the vertical direction. The casing 10 has a structure in which the installation attachment 42 is provided with the attachment mounting portion 43 that is used to fix the installation attachment 42 to the counterpart-side installation surface 38. Accordingly, even in a case in which the casing 10 is installed so that the output shaft 12 is parallel to the vertical direction, bolts can be tightened at a total of six positions when the casing 10 needs to be more strongly installed.

Since the installation attachment 42 is detachably mounted on the input-side casing part 10A by bolts 40, the installation attachment 42 does not need to be mounted in a case in which the casing 10 does not need to be strongly installed horizontally or vertically. Accordingly, costs can be reduced.

Further, the input-side casing part 10A of the casing 10 includes the lift fitting-fixing portion 46 to which the lift fitting is fixed when the casing 10 is lifted, and the lift fitting-fixing portion 46 and the attachment mounting portion 43 overlap each other when seen in the Y direction (the axial direction of the output shaft 12). However, the lift fitting-fixing portion 46 is provided at the position that is spaced apart from the attachment mounting portion 43 in the axial direction of the output shaft 12 by H (42-46).

Generally, two lift fitting-fixing portions (46) are often provided at two positions on the input-side casing part 10A. However, in this case, there is a concern that the lift fitting-fixing portions may interfere with the attachment mounting portion 43. In the casing 10, only one lift fitting-fixing portion 46 (is provided on the input-side casing part 10A in the Y direction and) is provided at a position that is spaced apart from the attachment mounting portion 43 in the Y direction by H (42-46).

For this reason, since the interference between the attachment mounting portion 43 and the lift fitting-fixing portion 46 can be prevented, the installation of the casing 10 using the attachment mounting portion 43 is not obstructed by the presence of the lift fitting-fixing portion 46.

In other words, in this structure, the input-side casing part 10A includes the attachment-upper space V42 above the attachment mounting portion 43. It is also possible to strongly and easily install the casing 10 at the input-side casing part 10A by using the installation attachment 42.

Further, the casing 10 has a structure in which the input-side casing part 10A includes the inspection hole 22 and the inspection hole 22 does not reach the output-side casing part 10B. If the inspection hole 22 is made to extend up to the output-side casing part 10B, it is particularly difficult to ensure spaces above the mounting portions for vertical installation at two corners, which are close to the input-side casing part 10A, among the four corners of the output-side casing part 10B.

Since the entire casing 10 has a bisecting structure including the first casing body 10F and the second casing body 10G, (the assembly of a gear and the like is not performed through the inspection hole 22 and) the assembly of a gear and the like is performed from the opening of the first casing body 10F or the second casing body 10G, which uses the bisecting structure, by using the fact that the assembly of a gear and the like may not be performed through the inspection hole 22. Accordingly, the inspection hole 22 is made small not to reach the output-side casing part 10B so that the mounting portion-upper spaces V34 are ensured above the mounting portions 34 for vertical installation provided at the four corners of the output-side casing part 10B.

The inspection hole 22 may reach the output-side casing part 10B. In this case, it is preferable that the width of an inspection hole of the output-side casing part 10B in the Y direction is set to be smaller than the width of an inspection hole of the input-side casing part 10A or the width of an inspection hole in the Y direction is constant but is set to be smaller than the width of the inspection hole 22 of the embodiment in the Y direction.

Further, in the casing 10, the mounting portion-upper space V34 is formed above the installation bolt hole 34s, which is formed so as to pass through each of the mounting portions 34 for vertical installation in the Y direction (the axial direction of the output shaft 12), so as to be opened in two directions (the X direction and the Z direction) that are orthogonal to each other. For this reason, particularly, the tightening of bolts using the installation bolt holes 34s of the output-side casing part 10B, which are positioned close to the input-side casing part 10A, can be easily performed in the vertical installation.

In the example of the structure, the input shaft has been orthogonal to the output shaft and the rectangular speed reducing mechanism has been provided on the first stage. However, the speed reducing mechanism, which is housed in the casing according to the invention, is not necessarily limited to this speed reducing mechanism, and may be a speed reducing mechanism that is formed of, for example, only a parallel shaft-speed reducing mechanism. Further, the number of the stages of the speed reducing mechanism, which is housed in the input-side casing part and the output-side casing part, is also not particularly limited to the example of the structure.

Furthermore, in the example of the structure, the casing has been adapted to be divided into two parts on a bisecting plane that includes the axis of the input shaft and the axis of the output shaft. However, the casing according to the invention does not need to be necessarily capable of being divided into two parts.

Moreover, in the example of the structure, in regard to a dimension in the Y direction (the axial direction of the output shaft 12), a difference in height at the bottom-surface stepped portion 30 and a difference in height at the flat stepped portion 32 have been set to be equal (symmetrical) to each other when the dimension of the input-side casing part 10A is set to be smaller than a dimension of the output-side casing part 10B. If a difference in height at the bottom-surface stepped portion 30 and a difference in height at the flat stepped portion 32 are set to be symmetrical to each other, the same installation attachment 42 can be used even when the top surface P2 is used as a vertical installation surface and the bottom surface P3 is used as a vertical installation surface in the case of vertical installation.

However, when the dimension of the input-side casing part in the Y direction (the axial direction of the output shaft) is reduced, the dimension of the input-side casing part does not need to be necessarily reduced symmetrically as described above and the dimension of the input-side casing part to be reduced on the top surface may be different from the dimension of the input-side casing part to be reduced on the bottom surface in the invention. Further, the dimension of the input-side casing part may be significantly reduced only on one surface thereof (a difference in the height of the stepped portion is made large), and the other surface of the input-side casing part may be formed to be flush with the surface of the output-side casing part. In this case, when the casing is vertically installed using the installation surfaces flush with each other, the mounting portions for vertical installation can also be ensured at the input-side casing part without the interposition of an installation attachment. Accordingly, the casing can be connected at six positions.

It should be understood that the invention is not limited to the above-described embodiment, but may be modified into various forms on the basis of the spirit of the invention. Additionally, the modifications are included in the scope of the invention.

What is claimed is:

1. A casing comprising:
an input-side casing part that houses at least an input shaft; and
an output-side casing part that houses at least an output shaft and is provided closer to an output side than the input-side casing part is,
wherein in regard to a dimension in an axial direction of the output shaft, a maximum dimension of the input-side casing part is smaller than a maximum dimension of the output-side casing part,
the output-side casing part includes an output-side vertical installation surface that serves as an installation surface when the casing is installed so that the output shaft is parallel to a vertical direction,
the output-side vertical installation surface includes mounting portions for vertical installation near four corners thereof,
the input-side casing part includes an input-side horizontal installation surface that serves as an installation surface when the casing is installed so that the output shaft is parallel to a horizontal direction,
the output-side casing part includes an output-side horizontal installation surface that serves as an installation surface when the casing is installed so that the output shaft is parallel to the horizontal direction,
mounting portions for horizontal installation are provided near four corners of the output-side horizontal installation surface of the output-side casing part and on the input-side horizontal installation surface of the input-side casing part, and
when the casing is installed so that the output shaft is parallel to the vertical direction, a gap is formed between the input-side casing part and a counterpart-side installation surface, such that the input-side casing part does not come into contact with the counterpart-side installation surface.

2. The casing according to claim 1, further comprising:
an installation attachment that is mounted on the input-side casing part and comes into contact with the counterpart-side installation surface when the casing is installed so that the output shaft is parallel to a vertical direction,
wherein the installation attachment includes an attachment mounting portion for vertical installation that is used to fix the installation attachment to the counterpart-side installation surface.

3. The casing according to claim 2,
wherein the input-side casing part includes a lift fitting-fixing portion that is used when the casing is lifted,
the lift fitting-fixing portion and the attachment mounting portion for vertical installation overlap each other when seen in the axial direction of the output shaft, and
the lift fitting-fixing portion is provided at a position that is spaced apart from the attachment mounting portion in the axial direction of the output shaft.

4. The casing according to claim 2,
wherein the input-side casing part includes an attachment-upper space above the attachment mounting portion in the axial direction of the output shaft, for vertical installation.

5. The casing according to claim 1,
wherein the input-side casing part includes an inspection hole, and
the inspection hole does not reach the output-side casing part.

6. The casing according to claim 1,
wherein the output-side casing part includes bolt holes that pass through the mounting portions for vertical installation in the axial direction of the output shaft,
bolt hole-upper spaces are provided above the bolt holes of the mounting portions in the axial direction of the output shaft, for vertical installation, and
the bolt hole-upper spaces are opened in two directions that are orthogonal to each other.

7. The casing according to claim 1,
wherein, when the casing is installed so that the output shaft is parallel to the vertical direction, a first step portion is formed between a surface of the output-side casing part facing the counterpart-side installation surface and a surface of the input-side casing part facing the counterpart-side installation surface.

8. The casing according to claim 7,
wherein, when the casing is installed so that the output shaft is parallel to the vertical direction, a second step portion is formed between a surface of the output-side casing part opposite the counterpart-side installation surface and a surface of the input-side casing part opposite the counterpart-side installation surface.

9. The casing according to claim 8,
wherein a difference in height of the first step portion is equal to a difference in height of the second step portion.

10. The casing according to claim 1,
wherein the input-side casing part is formed substantially in the shape of a first rectangular parallelepiped and the output-side casing part is formed substantially in the shape of a second rectangular parallelepiped.

\* \* \* \* \*